(12) United States Patent
Palanisamy et al.

(10) Patent No.: US 7,572,313 B2
(45) Date of Patent: Aug. 11, 2009

(54) TERNARY CARBIDE AND NITRIDE COMPOSITES HAVING TRIBOLOGICAL APPLICATIONS AND METHODS OF MAKING SAME

(75) Inventors: Thirumalai G. Palanisamy, Morristown, NJ (US); Surojit Gupta, Philadelphia, PA (US); Michel Barsoum, Moorestown, NJ (US); Chien-Wei Li, Livingston, NJ (US)

(73) Assignee: Drexel University, Philadelphia, PA (US)

( * ) Notice: Subject to any disclaimer, the term of this patent is extended or adjusted under 35 U.S.C. 154(b) by 548 days.

(21) Appl. No.: 11/127,524

(22) Filed: May 10, 2005

(65) Prior Publication Data

US 2005/0262965 A1    Dec. 1, 2005

Related U.S. Application Data

(60) Provisional application No. 60/575,040, filed on May 26, 2004.

(51) Int. Cl.
*C22C 29/02*  (2006.01)
*C22C 29/16*  (2006.01)

(52) U.S. Cl. .............................. 75/241; 75/244; 75/247; 428/627

(58) Field of Classification Search ................. 428/627; 75/241, 244, 247
See application file for complete search history.

(56) References Cited

U.S. PATENT DOCUMENTS

| | | | | | |
|---|---|---|---|---|---|
| 3,540,878 | A | * | 11/1970 | Levine et al. | 148/421 |
| 4,944,800 | A | * | 7/1990 | Kolaska et al. | 75/238 |
| 5,882,561 | A | * | 3/1999 | Barsoum et al. | 501/88 |
| 2005/0287296 | A1 | * | 12/2005 | Wadley et al. | 427/248.1 |
| 2006/0194688 | A1 | * | 8/2006 | Sundberg et al. | 501/87 |

* cited by examiner

*Primary Examiner*—Roy King
*Assistant Examiner*—Ngoclan T Mai
(74) *Attorney, Agent, or Firm*—Ingrassia, Fisher & Lorenz, P.C.

(57) ABSTRACT

A turbomachinery component includes a substrate having a surface, the surface consisting essentially of at least one composite of at least one metal and at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3. The component is made by compressing a powdered material to form a substrate that consists essentially of the composite and sintering the substrate, or by coating a substrate with the composite.

10 Claims, 2 Drawing Sheets

TERNARY CARBIDE AND NITRIDE COMPOSITES HAVING TRIBOLOGICAL APPLICATIONS AND METHODS OF MAKING SAME

CROSS-REFERENCES TO RELATED APPLICATIONS

This application claims the benefit of U.S. Provisional Application No. 60/575,040, filed on May 26, 2004.

STATEMENT REGARDING FEDERALLY SPONSORED RESEARCH OR DEVELOPMENT

This invention was made with Government support under Contract No. N00421-03-C-0085 awarded by the U.S. Navy. The Government has certain rights in this invention.

TECHNICAL FIELD

The present invention relates to high temperature machinery, and more particularly relates to lubricants that reduce friction between, and thereby extend the workable life of, high temperature machinery such as turbomachinery components.

BACKGROUND

In the context of turbine engines, turbochargers use heat and volumetric flow of engine exhaust gas to pressurize or boost an intake air stream into a combustion chamber. Specifically, exhaust gas from the engine is routed into a turbocharger turbine housing. A turbine is mounted inside the housing, and the exhaust gas flow causes the turbine to spin. The turbine is mounted on one end of a shaft that has a radial air compressor mounted on an opposite end thereof. Thus, rotary action of the turbine also causes the air compressor to spin. The spinning action of the air compressor causes intake air to enter a compressor housing and to be pressurized or boosted before the intake air is mixed with fuel and combusted within the engine combustion chamber.

Solid lubricants are useful for reducing the weight and complexity, and increasing the reliability of various high temperature machinery such as turbochargers. Some examples of turbocharger components that would benefit from solid lubricants include the turbocharger shaft and the bearings that support the shaft. Some known solid lubricants include graphite fluoride/polymer composites, molybdenum disulfide, silver, calcium fluoride, and barium fluoride. However, these materials may not be particularly useful for high temperature machinery since they have relatively high porosity, can be difficult to coat, and/or are only stable at temperatures below about 250° C.

Some high temperature airfoil coatings are also useful as solid lubricants. Examples of such airfoil coatings include hard nitride or carbide coatings, and metal-ceramic composite coatings that include embedded solid lubricants such as silver and calcium fluoride, and further include high temperature low-friction materials such as molybdenum sulfide. However, none of the existing coating materials or systems has an adequate friction coefficient, wear property, thermal stability, and load carrying capability over an operating temperature range for many turbocharger components and other high temperature machinery.

Hence, there is a need for methods and materials for manufacturing and/or coating turbomachinery or other machinery with a solid lubricant that has a low friction coefficient and a low wear rate against hard superalloy materials. There is a particular need for a self-lubricating or in situ lubricating material with ceramic-like oxidation resistant properties and metal-like fracture toughness, particularly at high temperatures.

BRIEF SUMMARY

The present invention provides a turbomachinery component, comprising a substrate having a surface, the surface consisting essentially of at least one composite of at least one metal and at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

The present invention also provides methods of manufacturing a turbomachinery component. One method comprises the step of compressing a powder mixture to form a substrate consisting essentially of at least one composite of at the least one metal and at the least one compound having the chemical formula $M_{n+1}AX_n$. After compressing the powder and forming the substrate, the substrate is sintered.

Another method of manufacturing a turbomachinery component comprises the step of coating a substrate with at least one composite of at the least one metal and at the least one compound having the chemical formula $M_{n+1}AX_n$.

Other independent features and advantages of the preferred methods will become apparent from the following detailed description, taken in conjunction with the accompanying drawings which illustrate, by way of example, the principles of the invention.

DETAILED DESCRIPTION OF A PREFERRED EMBODIMENT

Figure 1:
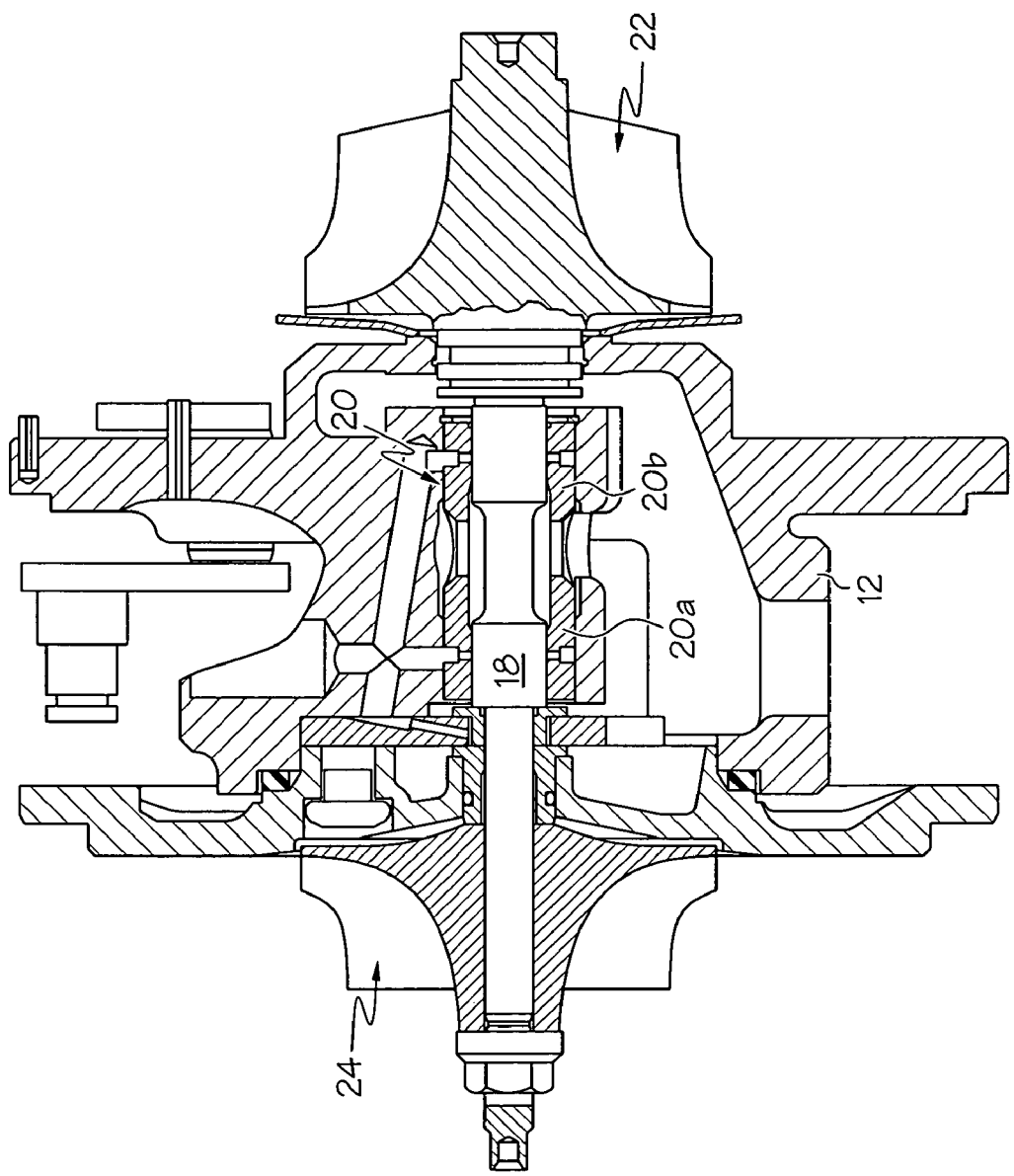
FIG. 1 is a cross-sectional side view of a turbocharger.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention provides materials that are useful as solid lubricants. The materials exhibit a low wear rate and a low coefficient of friction, particularly when they form a tribocouple with hard superalloys such as those commonly used to manufacture propulsion engines and other turbomachinery. Although the materials are useful as solid lubricants, they have sufficient hardness and strength for use as base structural materials. The materials are also easily applied as coatings for a variety of structural substrates.

The solid lubricant materials are composites of at least one metal combined with at least one member of a class of ternary compounds defined by the general composition $M_{n+1}AX_n$, hereinafter MAX, wherein M is an early transition metal selected from groups IIIB, IVB, VB, and VIB, A is an element selected from groups IIIA, IVA, VA, VIA, and VIIA, X is either carbon or nitrogen, and n is an integer between 1 and 3.

Exemplary transition metals for the MAX compounds include scandium, titanium, vanadium, chromium, zirconium, niobium, molybdenum, hafnium, and tantalum. Exemplary group A elements include aluminum, gallium, indium, tellurium, silicon, geranium, tin, lead, phosphorus, arsenic, and sulfur. An exemplary metal that is combined with the MAX compounds is a soft metal such as silver, gold, cupper, platinum, and combinations or alloys of the same. Preferred soft metals include gold and silver at a concentration ranging between about 5 and about 30% by weight.

Table I below displays preferred MAX ternary compounds, organized according to the A group in each compound. As set forth in the table, there are approximately fifty preferred $M_2AX$, or 2-1-1 compounds, three preferred $M_3AX_2$, or 3-1-2 compounds, and two preferred $M_4AX_3$, or 4-1-3 compounds that are suitable solid lubricants.

TABLE 1

| IIIA | IVA | VA | VIA |
|---|---|---|---|
| Al | Si | P | S |
| $V_2AlC$, $Cr_2AlC$, $Nb_2AlC$, $(Ti,Nb)_2AlC$, $Ta_2AlC$, $Ti_2AlC$, $Ti_2AlN_{0.5}C_{05}$, $Ti_2AlN$, $Ti_3AlC_2$, $Ti_4AlN_3$, $Ta_4AlC_3$ | $Ti_3SiC_2$, $Ti_3(Si, Ge)C_2$ | $V_2PC$, $Nb_2PC$ | $Ti_2SC$, $Zr_2SC$, $Nb_2SC$, $Hf_2SC$ |
| Ga | Ge | As | |
| $Ti_2GaC$, $V_2GaC$, $Cr_2GaC$, $Nb_2GaC$, $Mo_2GaC$, $Ta_2GaC$, $Ti_2GaN$, $Cr_2GaN$, $V_2GaN$ | $Ti_2GeC$, $V_2GeC$, $Cr_2GeC$, $Ti_3GeC_2$ | $V_2AsC$, $Nb_2AsC$ | |
| In | Sn | | |
| $Sc_2InC$, $Ti_2InC$, $Zr_2InC$, $Nb_2InC$, $Hf_2InC$, $Ti_2InN$, $Zr_2InN$, $Hf_2InN$ | $Ti_2SnC$, $Zr_2SnC$, $Nb_2SnC$, $Hf_2SnC$, $Hf_2SnN$ | | |
| Tl | Pb | | |
| $Ti_2TlC$, $Zr_2TlC$, $Hf_2TlC$, $Zr_2TlN$ | $Ti_2PbC$, $Hf_2PbC$, $Zr_2PbC$ | | |

Before discussing in detail various composite materials including MAX compounds combined with a metal, some structural and functional features of MAX ternary compound phases will be discussed. Even without the added metal, solid phase materials from MAX compounds are structured in a manner that enables their use in tribological applications. The materials form a phase that has a hexagonal (P6/mmc) crystal lattice structure in a rock salt-like layered configuration in which the group A elements are interleaved with $M_{n+1}X_n$ layers. The solid phases delaminate and deform at room temperature in a unique manner. Basal plane dislocations are mobile and they multiply at temperatures as low as about −196° C. (77 K). Further, the dislocations glide exclusively on the basal planes, and are almost substantially if not entirely arranged in arrays or kink boundaries. Single grains are capable of undergoing a combination of deformations including slip, kink band formation, and delamination, all of which are dislocation based.

Another unique property that MAX compound-based materials share is the ability to undergo fully reversible plasticity. As a general principle, crystalline solids exhibit irreversible plasticity; the MAX compound-based materials are an exception to this principle. In fact, indentations made on $Ti_3SiC_2$ phases during plasticity experiments were not traceable due to the fully reversible plasticity for the MAX compound-based materials.

Many of the MAX compound-based materials are also elastically quite stiff. Some of the particularly stiff MAX compound-based include $Ti_3SiC_2$, $Ti_3AlC_2$, and $Ti_4AlN_3$. For example, at 320 GPa, $Ti_3SiC_2$ has a stiffness that is almost three times that of titanium metal, but the two materials have comparable densities of ≈4.5 g/cm³. Despite their high stiffness, the MAX compound-based are relatively soft, particularly when compared with the chemically similar transition metal carbides. The softness and high stiffness properties make the MAX compound-based readily machinable with relative ease. In fact, the MAX compound-based are machinable with basic tools such as a manual hacksaw or high-speed tool steels, generally without any need for lubrication or for cooling materials and processes.

Further, the MAX compound-based materials are damage tolerant and thermal shock resistant; some are highly fatigue resistant and oxidation resistant as well. Some materials on which tests were conducted at temperatures as high as 800° C. exhibited high resistance to oxidation.

In addition to the above-discussed features that the MAX compound-based materials inherently provide, a composite material that includes the MAX compounds and at least one metal such as copper, platinum, silver, gold, aluminum, and combinations and alloys of the same is further optimized by the additional softness provided by the metal. Composite materials including the metal and the MAX compounds have a lower friction coefficient than do the MAX materials alone, and also have better wear properties.

As previously mentioned, the composite materials including at least one metal and at least one MAX ternary compound can be used as structural materials, or as a solid lubricant protective coating for a variety of different high temperature machinery including turbomachinery. For example, high temperature airfoil shafts and bearings are needed for the next generation of high power density turbomachinery. The composite materials provide high efficiency, lightweight, low maintenance, and low cost propulsion engine components or component coatings. Coatings of one or more composite materials can be easily applied using conventional plating, deposition, and spraying methods.

Turning now to FIG. 1, a cross-sectional side view of an exemplary turbocharger is illustrated. The turbocharger generally comprises a central housing 12 in which a shaft 18 is rotatably disposed within a bearing assembly 20 including bearings 20a, 20b. A turbine or turbine wheel 22 is attached to one shaft end and is disposed within a turbine housing attached to the central housing 12 at one end. A compressor impeller 24 is attached to an opposite shaft end and is disposed within a compressor housing attached to the central housing 12 at and end opposite the turbine housing. The turbine and compressor housings are attached to the center housing by, for example, bolts that extend between the adjacent housings.

Some turbocharger components that can be made from or coated with one or more of the composite materials, including at least one metal and at least one MAX ternary compound, include the bearing assembly 20 and the shaft 18. Tests performed at up to 650° C. reveal that the composite materials form a good tribocouple with superalloys such as Inconel and Rene 41, which are sometimes used to make turbomachinery components such as bearing assemblies and shafts. The composite materials provide low friction coefficients and low wear rates for such components. It is also emphasized again that turbocharger components are just one example of the type of high temperature machinery that can be manufactured or coated using the composite materials. Further, tribological properties can be optimized by making or coating components using phases that include at least two composite materials that are selected according to their individual features.

Figure 2:
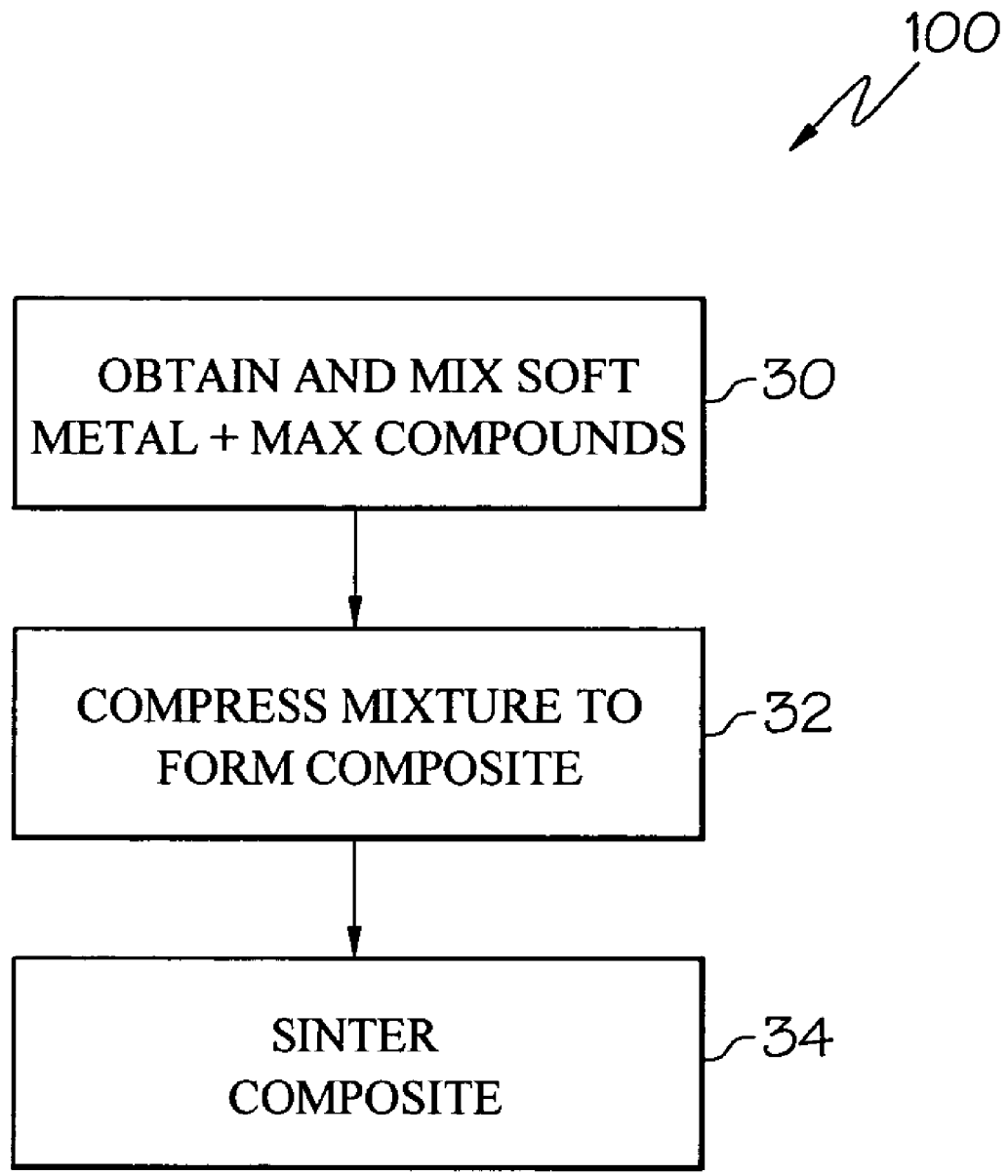
FIG. 2 is a flow diagram of an exemplary method for manufacturing a ternary carbide or nitride in accordance with the present invention.

Turning now to FIG. 2, an exemplary method 100 is outlined for manufacturing a composite material including at least one metal and at least one MAX ternary compound. The first step 30 comprises obtaining and mixing the metal and MAX compounds. Soft metals such as silver, gold, copper, and platinum can be obtained as grains of various mesh size. Silver is an exemplary soft metal, and silver grains are preferably provided with a mesh size ranging between about 180 and about 325 mesh. While many of the MAX compounds from Table 1 are already obtainable as pre-reacted powders at various grain sizes, others such as $Cr_2AlC$, $V_2AlC$, $Ta_2AlC$, $Ta_4AlC_3$, $Ti_2AlC$, $Ti_3AlC_2$, $Ti_4AlN_3$, and $Ti_2AlN$ can be efficiently manufactured.

An exemplary method for preparing MAX compounds starts with preparing a powder mixture. For example, the powder mixture may consist of elemental powders, with each powder combined in stoichiometric proportions. For example, when preparing a 2-1-1 compound, molar equivalents (1x) of the group A element and the carbon or nitrogen are combined with two molar equivalents (2x) of the early transition metal. Another exemplary powder mixture comprises binary compounds such as carbides, nitrides, suicides, and so forth. The powders can be uniformly combined by ball milling or by using other suitable mixing procedures. The powder mixture is then compressed and heat sintered. The compressing and heating steps can be performed simultaneously or in sequence. Then, a hot isostatic pressing (HIP) procedure is performed on the compressed or sintered powders. The HIP procedure is performed until the MAX compounds are formed and are essentially free of unreacted elemental powders.

After obtaining the metal and the MAX compounds, it may be necessary to crush some or all of the components using a mortar and pestle to form a powder. In an exemplary method, the MAX compounds are first crushed and mixed in a mortar and pestle for approximately one hour, although this time may be readily modified. Silver or another suitable metal is then added to the crushed MAX compounds, and the combined powders are again crushed and mixed in a mortar and pestle for another hour, although again this time may be readily modified.

Step 32 comprises compressing the mixture to compress the powders into one or more composite pellets. An exemplary compressing process comprises cold pressing the composite pellets. The cold pressing may be performed using any number of conventional mechanical processes. An exemplary cold pressing method is cold isostatic pressing.

Step 34 comprises sintering the composite of at least one MAX compound and at least one metal to thereby further consolidate the composite. There are many exemplary procedures for sintering the composite, including pressureless sintering, hot isostatic pressure-derived sintering, hot pressing, and combinations of such procedures.

An exemplary pressureless sintering procedure is carried out at temperatures ranging between about 900 and 1200° C. in the presence of an inert gas such as argon, and preferably at temperatures ranging between about 900 and 1100° C. as testing has shown that tribological properties tend to improve for composites prepared at lower temperatures.

For some composites, additional processing may be desirable to decrease the composite porosity and thereby increase the composite density. Pressureless sintering may be followed by hot pressing or hot isostatic pressing to increase composite density.

An exemplary hot isostatic pressing includes the steps of heating a composite at 10° C./min to about 1000° C., pressurizing the heated composite to between about 70 and about 100 MPa using an inert gas such as argon, and then increasing the temperature to about 1100° C. for 10 to 20 minutes. The temperatures and pressures may be readily modified to suit the individual MAX compounds and the metal.

As an alternative to the procedure outlined in FIG. 2, a hot isostatic pressure-derived sintering process can be performed to both compress and sinter a powder mixture of at least one MAX compound and at least one metal. An exemplary hot isostatic pressure-derived sintering process includes the steps of placing the powder mixture into a suitable holder such as a sealed steel metal or glass container. The powder mixture is then heated, without pressure, at least to the metal melting temperature. The high temperature causes the powder to form a composite as the soft metal melts. The melted metal then fills and closes the pores inside the composite. Once the pores are filled with the metal, pressure is increased to a high value to density the final composite.

The following examples represent some tests performed on composites of silver and sulfur-based carbides or aluminum-based carbides having the MAX structure to determine their tribological properties. These examples in no way limit the scope of the invention, but are rather detailed in order to establish the best mode of making and using some of the composite materials having good friction and wear properties at room temperature and at up to 800° C.

Friction tests were carried out using a high temperature tribometer to characterize the tribological properties of the $Cr_2AlC/Ag$, $Ti_2SC/Ag$, $Ti_4AlN_3/Ag$, and $Ta_2AlC/Ag$ composite materials. Friction and wear tests were performed by polishing a 2 mm thick composite disc and other 6 mm thick superalloy discs to a 1 μm finish, and running the discs at linear speeds of 100 to 500 cm/s at a 3N load. Other tests were also performed at other speeds and loads. Samples were weighed before and after the tests to detect any material transfer or loss. Some samples were also viewed under microscopes to determine roughness and changes in surface condition.

Table 2 outlines the test results from the tribological tests against the superalloy Inconel-600. For all of the tested composites the friction coefficient was better than 0.7 when the rotation speeds were between 80 and 100 cm/s, and the measurement was either maintained or reduced as rotation speeds increased.

The results from Table 2 revealed that the addition of silver to MAX phase materials significantly improved the friction coefficient when compared with substantially pure MAX phase materials, particularly at lower temperatures such as room temperature. Based on this finding, two $Cr_2AlC/Ag$ composites were tested; one composite included 12% silver, and the other composite included 20% silver. The higher silver content had a beneficial effect on both the friction coefficient and the wear rate.

Thermal cycling tests were also performed to determine whether particular MAX/silver composites are able to undergo repeated temperature increases and decreases. The results of the cycling tests are also outlined in Table 2. The $Cr_2AlC/Ag(20\%)$ and $Ta_2AlC/Ag(20\%)$ composites with fine particles were tested at temperatures of 100° C., 300° C., 500° C., 100° C. after cooling, and 500° C. after reheating. $Cr_2AlC/Ag$ and $Ta_2AlC/Ag$ were chosen since these composites had very low wear rates, particularly at high temperatures.

The tests revealed that the friction coefficient for the $Cr_2AlC/Ag(20\%)$ composite was less than or equal to 0.5 throughout the thermal cycle. For the Ta$_2$AlC/Ag(20%) composite, the friction coefficient varied between 0.2 and 0.3 as the temperature varied between 100° C. and 450° C., and was less than 0.5 at 500° C. for as long as 1400 meters. Thus, the tested composites were found to be capable of thermal cycling while retaining their lubricities.

TABLE 2

| Material | Wear Rate (mg/cm$^2$ - s) | Friction Coefficient (3N load, $\mu_{mean}$) |
|---|---|---|
| Ti$_2$Sc—Ag(15%) | 0.016 | 0.5 @ 100 cm/s |
| Ti$_4$AlN$_3$—Ag(15%) | 0.03 | 0.67 @ 100 cm/s |
|  |  | 0.5 @ 600 cm/s |
| Cr$_2$AlC—Ag(12%) | 0.03 | 0.6 @ 80 cm/s |
|  |  | 0.45 @ 300 cm/s |
| Cr$_2$AlC—Ag(20%) | 0.009 | 0.5 @ 100 cm/s |
|  |  | 0.4 @ 300 cm/s |
| Ta$_2$AlC—Ag(20%) | 0.02 | 0.5 @ 100 cm/s |
| Fine$^\varnothing$ |  | 0.3 @ 300 cm/s |
| Ta$_2$AlC—Ag(20%) | 0.005 | 0.6 @ 100 cm/s |
| Coarse$^{\varnothing\varnothing}$ |  | 0.4 @ 200 cm/s |
| Cr$_2$AlC—Ag(20%) | 0.0018 | 0.4 @ 100 cm/s |
| 100° C. |  | 0.4 @ 300 cm/s |
| Cr$_2$AlC—Ag(20%) | 0.0005 | 0.5 @ 100 cm/s |
| 300° C. |  | 0.45 @ 300 cm/s |
| Cr$_2$AlC—Ag(20%) | Negligible | 0.5 @ 100 cm/s |
| 500° C. |  | 0.4 @ 300 cm/s |
| Ta$_2$AlC—Ag(20%) | 0.01 | 0.35 @ 100 cm/s |
| Fine$^\varnothing$ 100° C. |  | 0.3 @ 300 cm/s |
| Ta$_2$AlC—Ag(20%) | 0.0007 | 0.38 @ 100 cm/s |
| Fine$^\varnothing$ 300° C. |  | 0.34 @ 300 cm/s |
| Ta$_2$AlC—Ag(20%) | 0.0002 | 0.45 @ 100 cm/s |
| Fine$^\varnothing$ 500° C. |  | 0.38 @ 300 cm/s |

$^\varnothing$ = Fine particles due to long mixing time (2 hours).
$^{\varnothing\varnothing}$ = Coarse particles due to short mixing time (1 hour).
For all samples, the substrate used was Inconel-600.
Unless otherwise noted, tests were run at room temperature.

The present invention thus provides materials that are useful as solid lubricants, particularly at high temperatures. The test results shown in Table 2 illustrate that the MAX/Ag composite materials exhibit a low wear rate and a low coefficient of friction when they form a tribocouple with a hard superalloy. It is again emphasized that the composite materials have sufficient hardness and strength for use either as base structural materials or as coatings for a variety of structural substrates.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed herein as the best mode contemplated for carrying out this invention, but that the invention will include all embodiments falling within the scope of the appended claims.

We claim:

1. A turbomachinery component, comprising:
a substrate having a surface, the surface consisting essentially of at least one composite of at least one metal and at least one compound having the chemical formula M$_{n+1}$AX$_n$,
wherein the at least one metal comprises at least one soft metal selected from the group consisting of silver and gold, and
wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, and the at least one compound does not include Ti$_2$AlN.

2. The turbomachinery component according to claim 1, wherein the transition metal is at least one element selected from the group consisting of scandium, titanium, vanadium, chromium, zirconium, niobium, molybdenum, hafnium, and tantalum, and
the group A element is at least one element selected from the group consisting of aluminum, gallium, indium, tellurium, silicon, geranium, tin, lead, phosphorus, arsenic, and sulfur.

3. The turbomachinery component according to claim 1, wherein the at least one composite comprises at least one metal and at least one compound selected from the group consisting of Cr$_2$AlC, V$_2$AlC, Ti$_3$AlC$_2$, Ti$_4$AlN$_3$, Ta$_2$AlC, Ta$_4$AlC$_3$, and Ti$_3$SiC$_2$.

4. The turbomachinery component according to claim 1, wherein the at least one composite comprises gold or silver, and at least one compound selected from the group consisting of Cr$_2$AlC and Ta$_2$AlC.

5. A turbomachinery component, comprising:
a substrate having a surface, the surface consisting essentially of at least one composite of at least one soft metal selected from the group consisting of silver and gold and at least one compound having the chemical formula M$_{n+1}$AX$_n$,
wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

6. The turbomachinery component according to claim 5, wherein the transition metal is at least one element selected from the group consisting of scandium, titanium, vanadium, chromium, zirconium, niobium, molybdenum, hafnium, and tantalum, and the group A element is at least one element selected from the group consisting of aluminum, gallium, indium, tellurium, silicon, geranium, tin, lead, phosphorus, arsenic, and sulfur.

7. The turbomachinery component according to claim 5, wherein the at least one composite comprises at least one metal and at least one compound selected from the group consisting of Cr$_2$AlC, V$_2$AlC, Ti$_2$AlC, Ti$_3$AlC$_2$, Ti$_4$AlN$_3$, Ta$_2$AlC, Ta$_4$AlC$_3$, Ti$_2$AlN, and Ti$_3$SiC$_2$.

8. The turbomachinery component according to claim 5, wherein the at least one compound is selected from the group consisting of Cr$_2$AlC and Ta$_2$AlC.

9. A turbomachinery component, comprising:
a substrate having a surface, the surface consisting essentially of at least one composite of at least one metal and at least one compound,
wherein:
the at least one metal comprises at least one soft metal selected from the group consisting of silver and gold, and
the at least one compound is selected from the group consisting of Cr$_2$AlC, V$_2$AlC, Ti$_3$AlC$_2$, Ti$_4$AlN$_3$, Ta$_2$AlC, Ta$_4$AlC$_3$, and Ti$_3$SiC2.

10. The turbomachinery component according to claim 9, wherein the at least one composite comprises gold or silver, and at least one compound selected from the group consisting of Cr$_2$AlC and Ta$_2$AlC.

* * * * *

UNITED STATES PATENT AND TRADEMARK OFFICE
CERTIFICATE OF CORRECTION

PATENT NO. : 7,572,313 B2  Page 1 of 1
APPLICATION NO. : 11/127524
DATED : August 11, 2009
INVENTOR(S) : Palanisamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Fourteenth Day of December, 2010

David J. Kappos
*Director of the United States Patent and Trademark Office*